US012807749B2

(12) United States Patent
Isaka et al.

(10) Patent No.: US 12,807,749 B2
(45) Date of Patent: *Nov. 24, 2026

(54) COPOLYMER, MOLDED BODY, INJECTION MOLDED BODY, AND COATED ELECTRICAL WIRE

(71) Applicant: DAIKIN INDUSTRIES, LTD., Osaka (JP)

(72) Inventors: Tadaharu Isaka, Osaka (JP); Yumi Zenke, Osaka (JP); Yukari Yamamoto, Osaka (JP); Hayato Tsuda, Osaka (JP); Keizou Shiotsuki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 482 days.

This patent is subject to a terminal disclaimer.

(21) Appl. No.: 18/453,363

(22) Filed: Aug. 22, 2023

(65) Prior Publication Data

US 2023/0391931 A1 Dec. 7, 2023

Related U.S. Application Data

(63) Continuation of application No. PCT/JP2022/003638, filed on Jan. 31, 2022.

(30) Foreign Application Priority Data

Feb. 26, 2021 (JP) ................................ 2021-031090
Sep. 30, 2021 (JP) ................................ 2021-162117

(51) Int. Cl.
*C08F 214/26* (2006.01)
*H01B 3/44* (2006.01)

(52) U.S. Cl.
CPC ......... *C08F 214/262* (2013.01); *H01B 3/445* (2013.01)

(58) Field of Classification Search
CPC .............. C08F 214/262; C08F 2500/12; C08F 216/1408; C09D 127/18; H01B 3/445; H01B 3/44; H01B 7/02; H01B 3/441
USPC .............. 526/247; 174/138 R, 137 R, 138 C, 174/110 R–120 SR
See application file for complete search history.

(56) References Cited

U.S. PATENT DOCUMENTS 3,635,926 A 1/1972 Gresham et al.
3,945,786 A 3/1976 Bishop
4,029,868 A 6/1977 Carlson
4,262,101 A 4/1981 Hartwimmer et al.
4,414,356 A 11/1983 Michel
4,510,300 A 4/1985 Levy
4,743,658 A 5/1988 Imbalzano et al.
4,902,444 A 2/1990 Kolouch
4,999,221 A 3/1991 Eigenbrod et al.
5,000,875 A 3/1991 Kolouch
5,656,392 A 8/1997 Sano et al.
5,703,185 A 12/1997 Blair
5,767,198 A 6/1998 Shimizu et al.
5,851,693 A 12/1998 Sano et al.
6,066,707 A * 5/2000 Colaianna ........... C08F 214/262 526/247
6,069,215 A 5/2000 Araki et al.
6,096,795 A 8/2000 Abusleme et al.
6,689,833 B1 2/2004 Bidstrup et al.
6,713,183 B2 3/2004 Araki et al.
6,740,375 B1 5/2004 Sagisaka et al.
6,774,196 B1 8/2004 Taira et al.
8,143,351 B2 3/2012 Shiotsuki et al.
9,963,564 B2 5/2018 Imamura et al.
11,826,975 B2 11/2023 Imamura et al.
12,540,208 B2 * 2/2026 Isaka .................. C08F 214/262
2002/0011692 A1 1/2002 Lahijani
2002/0099143 A1 7/2002 Namura
2002/0167115 A1 11/2002 Tanaka
2003/0013791 A1 1/2003 Blong et al.
2003/0109646 A1 6/2003 Kubo et al.
2003/0114615 A1 6/2003 Sumi et al.
2003/0190530 A1 10/2003 Yang et al.
2003/0216531 A1 11/2003 Aten et al.
2004/0072935 A1 4/2004 Blong et al.
2004/0102572 A1 5/2004 Kubo et al.
2004/0204536 A1 10/2004 Miyatani et al.
2004/0260044 A1 12/2004 Earnest, Jr. et al.
2005/0020792 A1 * 1/2005 Aoyama .................. C08F 8/22 526/250

(Continued)

FOREIGN PATENT DOCUMENTS

CN 1527852 A 9/2004
CN 1599757 A 3/2005

(Continued)

OTHER PUBLICATIONS

International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.

(Continued)

*Primary Examiner* — Mark S Kaucher
(74) *Attorney, Agent, or Firm* — Sughrue Mion, PLLC

(57) ABSTRACT

There is provided a copolymer containing tetrafluoroethylene unit and perfluoro(propyl vinyl ether) unit, wherein the copolymer has a content of perfluoro(propyl vinyl ether) unit of 4.2 to 4.9% by mass with respect to the whole of the monomer units, a melt flow rate at 372° C. of 19.0 to 27.0 g/10 min, and the number of functional groups of 50 or less per $10^6$ main-chain carbon atoms.

6 Claims, No Drawings

(56) References Cited

U.S. PATENT DOCUMENTS

| | | | | |
|---|---|---|---|---|
| 2005/0245626 | A1* | 11/2005 | Hoaglund | C08J 9/0066 521/91 |
| 2007/0112155 | A1 | 5/2007 | Takase et al. | |
| 2007/0149734 | A1 | 6/2007 | Sakakibara et al. | |
| 2007/0281166 | A1 | 12/2007 | Nishio | |
| 2007/0292685 | A1* | 12/2007 | Brothers | C08F 214/26 264/171.15 |
| 2008/0038627 | A1 | 2/2008 | Yamauchi et al. | |
| 2008/0114143 | A1 | 5/2008 | Brothers et al. | |
| 2008/0241534 | A1 | 10/2008 | Ohtani et al. | |
| 2009/0038821 | A1 | 2/2009 | Sato et al. | |
| 2009/0044965 | A1 | 2/2009 | Kono et al. | |
| 2009/0176952 | A1 | 7/2009 | Funaki et al. | |
| 2009/0246435 | A1 | 10/2009 | Shimono et al. | |
| 2010/0063214 | A1 | 3/2010 | Kasahara et al. | |
| 2010/0212929 | A1 | 8/2010 | Ishii et al. | |
| 2010/0273047 | A1 | 10/2010 | Kunoike et al. | |
| 2010/0314153 | A1 | 12/2010 | Ishii et al. | |
| 2010/0314154 | A1 | 12/2010 | Kitahara et al. | |
| 2011/0052970 | A1 | 3/2011 | Kurata et al. | |
| 2011/0052977 | A1 | 3/2011 | Kurata et al. | |
| 2011/0104562 | A1 | 5/2011 | Byun et al. | |
| 2011/0203830 | A1 | 8/2011 | Kono et al. | |
| 2011/0272173 | A1 | 11/2011 | Shiotsuki et al. | |
| 2012/0035329 | A1 | 2/2012 | Isogai et al. | |
| 2012/0064273 | A1 | 3/2012 | Bacino | |
| 2012/0094169 | A1 | 4/2012 | Kim et al. | |
| 2013/0046058 | A1* | 2/2013 | Pham | C08F 214/262 264/239 |
| 2013/0130100 | A1 | 5/2013 | Kurata et al. | |
| 2014/0227533 | A1 | 8/2014 | Murakami et al. | |
| 2014/0287177 | A1 | 9/2014 | Suda et al. | |
| 2014/0378616 | A1 | 12/2014 | Nakano et al. | |
| 2015/0041145 | A1 | 2/2015 | Colaianna et al. | |
| 2015/0148481 | A1 | 5/2015 | Brothers et al. | |
| 2015/0158988 | A1 | 6/2015 | Sawaki et al. | |
| 2015/0322187 | A1 | 11/2015 | Miele et al. | |
| 2015/0353700 | A1 | 12/2015 | Isaka et al. | |
| 2016/0006004 | A1 | 1/2016 | Ogawa et al. | |
| 2016/0078979 | A1 | 3/2016 | Hosoda et al. | |
| 2016/0108159 | A1 | 4/2016 | Sekiguchi et al. | |
| 2016/0194491 | A1* | 7/2016 | Taguchi | C08L 27/20 428/379 |
| 2016/0272805 | A1 | 9/2016 | Nakanishi et al. | |
| 2016/0319089 | A1 | 11/2016 | Imamura et al. | |
| 2016/0322128 | A1 | 11/2016 | Imamura et al. | |
| 2016/0340455 | A1 | 11/2016 | Abe et al. | |
| 2017/0008986 | A1 | 1/2017 | Isaka et al. | |
| 2017/0025204 | A1 | 1/2017 | Chapman et al. | |
| 2017/0154707 | A1 | 6/2017 | Abe et al. | |
| 2017/0214037 | A1 | 7/2017 | Uematsu et al. | |
| 2017/0260344 | A1 | 9/2017 | Imamura et al. | |
| 2018/0009204 | A1 | 1/2018 | Higuchi et al. | |
| 2018/0036931 | A1 | 2/2018 | Higuchi et al. | |
| 2018/0237566 | A1 | 8/2018 | Aida et al. | |
| 2018/0265654 | A1 | 9/2018 | Imamura et al. | |
| 2018/0283590 | A1 | 10/2018 | Yokoyama et al. | |
| 2019/0134939 | A1 | 5/2019 | Colaianna et al. | |
| 2019/0143628 | A1 | 5/2019 | Colaianna et al. | |
| 2019/0177453 | A1 | 6/2019 | Isaka et al. | |
| 2019/0193315 | A1 | 6/2019 | Miyamoto et al. | |
| 2019/0375929 | A1 | 12/2019 | Nishimura et al. | |
| 2019/0382544 | A1* | 12/2019 | Yokotani | C08L 27/18 |
| 2020/0332037 | A1 | 10/2020 | Isaka et al. | |
| 2021/0008827 | A1 | 1/2021 | Colaianna et al. | |
| 2021/0008828 | A1 | 1/2021 | Colaianna et al. | |
| 2021/0024709 | A1 | 1/2021 | Fukushima et al. | |
| 2021/0024769 | A1 | 1/2021 | Imamura et al. | |
| 2021/0189031 | A1 | 6/2021 | Hintzer et al. | |
| 2021/0246237 | A1 | 8/2021 | Isaka et al. | |
| 2021/0269568 | A1 | 9/2021 | Imamura et al. | |
| 2022/0001657 | A1 | 1/2022 | Kikuchi et al. | |
| 2022/0033636 | A1 | 2/2022 | Nishimura et al. | |
| 2022/0170573 | A1 | 6/2022 | Imamura et al. | |
| 2022/0181689 | A1 | 6/2022 | Isaka et al. | |
| 2022/0181698 | A1 | 6/2022 | Isaka et al. | |
| 2022/0181729 | A1 | 6/2022 | Isaka et al. | |
| 2022/0195088 | A1 | 6/2022 | Imamura et al. | |
| 2022/0213996 | A1 | 7/2022 | Imamura et al. | |
| 2022/0266485 | A1 | 8/2022 | Tsuda et al. | |
| 2022/0278403 | A1 | 9/2022 | Isaka et al. | |
| 2023/0227594 | A1 | 7/2023 | Yamamoto et al. | |
| 2023/0235107 | A1 | 7/2023 | Isaka et al. | |
| 2023/0235159 | A1 | 7/2023 | Isaka et al. | |
| 2023/0235160 | A1 | 7/2023 | Isaka et al. | |
| 2023/0238627 | A1 | 7/2023 | Isaka et al. | |
| 2023/0238628 | A1 | 7/2023 | Zenke et al. | |
| 2023/0238629 | A1 | 7/2023 | Isaka et al. | |
| 2023/0272136 | A1 | 8/2023 | Zenke et al. | |
| 2023/0295356 | A1 | 9/2023 | Isaka et al. | |
| 2023/0344077 | A1 | 10/2023 | Qiu et al. | |
| 2023/0383031 | A1 | 11/2023 | Isaka et al. | |
| 2023/0383032 | A1 | 11/2023 | Isaka et al. | |
| 2023/0383033 | A1 | 11/2023 | Zenke et al. | |
| 2023/0383034 | A1 | 11/2023 | Isaka et al. | |
| 2023/0390977 | A1 | 12/2023 | Hamada et al. | |
| 2023/0390978 | A1 | 12/2023 | Tsuda et al. | |
| 2023/0390979 | A1 | 12/2023 | Tsuda et al. | |
| 2023/0390980 | A1 | 12/2023 | Tsuda et al. | |
| 2023/0390981 | A1 | 12/2023 | Tsuda et al. | |
| 2023/0391909 | A1 | 12/2023 | Isaka et al. | |
| 2023/0391910 | A1 | 12/2023 | Isaka et al. | |
| 2023/0391911 | A1 | 12/2023 | Isaka et al. | |
| 2023/0391912 | A1 | 12/2023 | Isaka et al. | |
| 2023/0391917 | A1 | 12/2023 | Isaka et al. | |
| 2023/0391920 | A1 | 12/2023 | Isaka et al. | |
| 2023/0391927 | A1 | 12/2023 | Isaka | |
| 2023/0391929 | A1 | 12/2023 | Isaka et al. | |
| 2023/0391931 | A1 | 12/2023 | Isaka et al. | |
| 2023/0391932 | A1 | 12/2023 | Isaka et al. | |
| 2023/0391933 | A1 | 12/2023 | Isaka et al. | |
| 2023/0392737 | A1 | 12/2023 | Tsuda et al. | |
| 2023/0395282 | A1 | 12/2023 | Isaka et al. | |
| 2023/0399431 | A1 | 12/2023 | Isaka et al. | |
| 2023/0399432 | A1 | 12/2023 | Isaka et al. | |
| 2023/0399438 | A1 | 12/2023 | Isaka et al. | |
| 2023/0399441 | A1 | 12/2023 | Isaka et al. | |
| 2023/0399443 | A1 | 12/2023 | Isaka et al. | |
| 2023/0406975 | A1 | 12/2023 | Isaka et al. | |
| 2023/0406976 | A1 | 12/2023 | Isaka et al. | |
| 2023/0411751 | A1 | 12/2023 | Tsuda et al. | |
| 2023/0415387 | A1 | 12/2023 | Hamada et al. | |
| 2025/0002728 | A1 | 1/2025 | Zenke et al. | |
| 2025/0011488 | A1 | 1/2025 | Isaka et al. | |
| 2025/0011490 | A1 | 1/2025 | Isaka et al. | |
| 2025/0011494 | A1 | 1/2025 | Isaka et al. | |
| 2025/0011496 | A1 | 1/2025 | Yamamoto et al. | |
| 2025/0011498 | A1 | 1/2025 | Isaka et al. | |
| 2025/0011499 | A1 | 1/2025 | Isaka et al. | |
| 2025/0011500 | A1 | 1/2025 | Isaka et al. | |
| 2025/0019476 | A1 | 1/2025 | Isaka et al. | |
| 2025/0034302 | A1 | 1/2025 | Isaka et al. | |

FOREIGN PATENT DOCUMENTS

| | | | | |
|---|---|---|---|---|
| CN | 101364456 | A | 2/2009 | |
| CN | 103946250 | A | 7/2014 | |
| CN | 107428144 | A | 12/2017 | |
| CN | 109476061 | A | 3/2019 | |
| CN | 110712348 | A | 1/2020 | |
| CN | 110790854 | A | 2/2020 | |
| CN | 114223086 | A | 3/2022 | |
| CN | 114258609 | A | 3/2022 | |
| CN | 116390957 | A | 7/2023 | |
| CN | 116867821 | A | 10/2023 | |
| CN | 116917346 | A | 10/2023 | |
| EP | 0 220 910 | A2 | 5/1987 | |
| EP | 0 423 995 | A1 | 4/1991 | |
| EP | 0 976 544 | A1 | 2/2000 | |
| EP | 1 260 526 | A1 | 11/2002 | |
| EP | 1 462 458 | A1 | 9/2004 | |
| EP | 3816214 | A1 * | 5/2021 | C08F 214/262 |
| EP | 4 024 550 | A1 | 7/2022 | |
| EP | 4 024 575 | A1 | 7/2022 | |

(56) References Cited

FOREIGN PATENT DOCUMENTS

| | | | | |
|---|---|---|---|---|
| EP | 4 223 793 | A1 | 8/2023 | |
| EP | 4 223 794 | A1 | 8/2023 | |
| GB | 1210794 | A | 10/1970 | |
| JP | 48-20788 | B1 | 6/1973 | |
| JP | 58-132512 | A | 8/1983 | |
| JP | 58-191127 | A | 11/1983 | |
| JP | 59-120433 | A | 7/1984 | |
| JP | 62-104822 | A | 5/1987 | |
| JP | 62-53019 | B2 | 11/1987 | |
| JP | 1-53167 | B2 | 11/1989 | |
| JP | 2-129253 | A | 5/1990 | |
| JP | 3-184209 | A | 8/1991 | |
| JP | 3-247609 | A | 11/1991 | |
| JP | 4-357398 | A | 12/1992 | |
| JP | 6-1902 | A | 1/1994 | |
| JP | 6-40813 | B2 | 6/1994 | |
| JP | 6-287405 | A | 10/1994 | |
| JP | 7-16869 | A | 1/1995 | |
| JP | 7-112449 | A | 5/1995 | |
| JP | 7-188337 | A | 7/1995 | |
| JP | 7-290496 | A | 11/1995 | |
| JP | 8-207106 | A | 8/1996 | |
| JP | 8-321287 | A | 12/1996 | |
| JP | 9-245832 | A | 9/1997 | |
| JP | 10-87746 | A | 4/1998 | |
| JP | 10-158456 | A | 6/1998 | |
| JP | 10-275604 | A | 10/1998 | |
| JP | 10-292054 | A | 11/1998 | |
| JP | 2001-151825 | A | 6/2001 | |
| JP | 2001-151826 | A | 6/2001 | |
| JP | 2001-283907 | A | 10/2001 | |
| JP | 2001-283921 | A | 10/2001 | |
| JP | 2002-53620 | A | 2/2002 | |
| JP | 2002-63934 | A | 2/2002 | |
| JP | 2002-167488 | A | 6/2002 | |
| JP | 2003-327770 | A | 11/2003 | |
| JP | 2003-534940 | A | 11/2003 | |
| JP | 2004-256406 | A | 9/2004 | |
| JP | 2004-534131 | A | 11/2004 | |
| JP | 2005-523979 | A | 8/2005 | |
| JP | 2005-298659 | A | 10/2005 | |
| JP | 2005-320497 | A | 11/2005 | |
| JP | 2006-117912 | A | 5/2006 | |
| JP | 2006-312736 | A | 11/2006 | |
| JP | 2007-238960 | A | 9/2007 | |
| JP | 2008-66254 | A | 3/2008 | |
| JP | 2009-42478 | A | 2/2009 | |
| JP | 2009-59690 | A | 3/2009 | |
| JP | 2009-235564 | A | 10/2009 | |
| JP | 2009-272207 | A | 11/2009 | |
| JP | 2010-56079 | A | 3/2010 | |
| JP | 2010-509443 | A | 3/2010 | |
| JP | 2010-85741 | A | 4/2010 | |
| JP | 2010-162817 | A | 7/2010 | |
| JP | 2010-235667 | A | 10/2010 | |
| JP | 2011-48976 | A | 3/2011 | |
| JP | 2011-71104 | A | 4/2011 | |
| JP | 2012-54269 | A | 3/2012 | |
| JP | 2012-80911 | A | 4/2012 | |
| JP | 2012-106494 | A | 6/2012 | |
| JP | 2012-130557 | A | 7/2012 | |
| JP | 2013-71341 | A | 4/2013 | |
| JP | 2013-82888 | A | 5/2013 | |
| JP | 2013-177574 | A | 9/2013 | |
| JP | 2014-28951 | A | 2/2014 | |
| JP | 2014-59052 | A | 4/2014 | |
| JP | 2014-187040 | A | 10/2014 | |
| JP | 2015-7218 | A | 1/2015 | |
| JP | 2015-519410 | A | 7/2015 | |
| JP | 2015-147924 | A | 8/2015 | |
| JP | 2015-168840 | A | 9/2015 | |
| JP | 2016-537499 | A | 12/2016 | |
| JP | 2017-197690 | A | 11/2017 | |
| JP | 2018-20468 | A | 2/2018 | |
| JP | 2018-514598 | A | 6/2018 | |
| JP | 2018-523272 | A | 8/2018 | |
| JP | 2018-159090 | A | 10/2018 | |
| JP | 2019-172962 | A | 10/2019 | |
| JP | 2019-210420 | A | 12/2019 | |
| JP | 2019-214641 | A | 12/2019 | |
| JP | 2020-2341 | A | 1/2020 | |
| JP | 2020-15906 | A | 1/2020 | |
| JP | 2020-29042 | A | 2/2020 | |
| JP | 2020-100823 | A | 7/2020 | |
| JP | 2020-100843 | A | 7/2020 | |
| JP | 2021-6648 | A | 1/2021 | |
| JP | 2021-141043 | A | 9/2021 | |
| JP | 2021-141045 | A | 9/2021 | |
| JP | 2022-19196 | A | 1/2022 | |
| KR | 10-2004-0071160 | A | 8/2004 | |
| KR | 10-2013-0069652 | A1 | 6/2013 | |
| KR | 10-2019-0034205 | A | 4/2019 | |
| WO | 95/29956 | A1 | 11/1995 | |
| WO | 01/40331 | A1 | 6/2001 | |
| WO | 03/006566 | A1 | 1/2003 | |
| WO | 03/048214 | A1 | 6/2003 | |
| WO | 2004/052987 | A1 | 6/2004 | |
| WO | 2008/032613 | A1 | 3/2008 | |
| WO | 2008/047759 | A1 | 4/2008 | |
| WO | 2008/047906 | A1 | 4/2008 | |
| WO | 2008/143069 | A1 | 11/2008 | |
| WO | 2010/113864 | A1 | 10/2010 | |
| WO | 2013/115374 | A1 | 8/2013 | |
| WO | 2014/007346 | A1 | 1/2014 | |
| WO | 2014/129413 | A1 | 8/2014 | |
| WO | 2015/119053 | A1 | 8/2015 | |
| WO | 2016/117492 | A1 | 7/2016 | |
| WO | 2017/056203 | A1 | 4/2017 | |
| WO | 2017/082417 | A1 | 5/2017 | |
| WO | 2019/003265 | A1 | 1/2019 | |
| WO | 2019/187725 | A1 | 10/2019 | |
| WO | 2019/189316 | A1 | 10/2019 | |
| WO | 2019/208492 | A1 | 10/2019 | |
| WO | WO-2020004083 | A1 * | 1/2020 | .......... C08F 214/262 |
| WO | 2020/090981 | A1 | 5/2020 | |
| WO | 2020/130144 | A1 | 6/2020 | |
| WO | 2020/204163 | A1 | 10/2020 | |
| WO | 2021/033539 | A1 | 2/2021 | |
| WO | 2021/039862 | A1 | 3/2021 | |
| WO | 2021/039863 | A1 | 3/2021 | |
| WO | 2021/039865 | A1 | 3/2021 | |
| WO | 2021039861 | A1 | 3/2021 | |
| WO | 2021039864 | A1 | 3/2021 | |
| WO | 2021/059753 | A1 | 4/2021 | |
| WO | 2022/181225 | A1 | 1/2022 | |
| WO | 2022/181231 | A1 | 9/2022 | |
| WO | 2022/181232 | A1 | 9/2022 | |

OTHER PUBLICATIONS

International Search Report dated Jun. 6, 2023 for International Application No. PCT/JP2023/013291.

International Search Report dated Jun. 6, 2023 for International Application No. PCT/JP2023/013292.

International Search Report dated Jun. 6, 2023 for International Application No. PCT/JP2023/013293.

International Search Report dated Jun. 6, 2023 for International Application No. PCT/JP2023/013331.

International Search Report dated Jun. 6, 2023 for International Application No. PCT/JP2023/013332.

International Search Report dated Jun. 6, 2023 for International Application No. PCT/JP2023/013333.

International Preliminary Report on Patentability, with Translation of Written Opinion issued Sep. 24, 2024 in International Application No. PCT/JP2023/013284.

International Preliminary Report on Patentability, with Translation of Written Opinion issued Sep. 24, 2024 in International Application No. PCT/JP2023/013285.

International Preliminary Report on Patentability, with Translation of Written Opinion issued Sep. 24, 2024 in International Application No. PCT/JP2023/013289.

International Preliminary Report on Patentability, with Translation of Written Opinion issued Sep. 24, 2024 in International Application No. PCT/JP2023/013290.

(56) References Cited

OTHER PUBLICATIONS

International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
European Search Report issued Feb. 10, 2025 for European Patent Application No. 22759283.9.
European Search Report issued Feb. 20, 2025 for European Patent Application No. 22759263.1.
Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.
International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.

(56) References Cited

OTHER PUBLICATIONS

Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.

(56) References Cited

OTHER PUBLICATIONS

International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

COPOLYMER, MOLDED BODY, INJECTION MOLDED BODY, AND COATED ELECTRICAL WIRE

CROSS-REFERENCE TO RELATED APPLICATIONS

This application is a Rule 53(b) Continuation of International Application No. PCT/JP2022/003638 filed Jan. 31, 2022, which claims priorities based on Japanese Patent Application No. 2021-031090 filed Feb. 26, 2021 and Japanese Patent Application No. 2021-162117 filed Sep. 30, 2021, the respective disclosures of which are incorporated herein by reference in their entirety.

TECHNICAL FIELD

The present disclosure relates to a copolymer, a formed article, an injection molded article, and a coated electric wire.

BACKGROUND ART

Patent Literature 1 discloses a tetrafluoroethylene copolymer comprising tetrafluoroethylene and perfluoro(alkyl vinyl ether) represented by the following general formula (I):

$$Rf—O—CF{=}CF_2 \quad (I)$$

wherein Rf represents a perfluoroalkyl group having 1 to 5 carbon atoms; wherein the number of unstable terminal groups is 10 to 100 per $10^6$ carbon atoms, and among the unstable terminal groups, the number of —COF and/or —COOH is 10 to 100 in total per $10^6$ carbon atoms.

RELATED ART

Patent Literature

Patent Literature 1: Japanese Patent Laid-Open No. 2005-320497

SUMMARY

According to the present disclosure, there is provided a copolymer comprising tetrafluoroethylene unit and perfluoro(propyl vinyl ether) unit, wherein the copolymer has a content of perfluoro(propyl vinyl ether) unit of 4.2 to 4.9% by mass with respect to the whole of the monomer units, a melt flow rate at 372° C. of 19.0 to 27.0 g/10 min, and the number of functional groups of 50 or less per $10^6$ main-chain carbon atoms.

Effects

According to the present disclosure, there can be provided a copolymer that is capable of providing a thin visually attractive formed article by being formed by injection molding at an extremely high injection rate, that hardly corrodes a metal mold to be used for forming and a core wire coated therewith, that is capable of forming at a high rate a thin coating layer on a core wire having a small diameter by extrusion forming, and that is capable of providing a formed article which has excellent water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, which is hardly cracked even when brought into contact with a chemical, and which hardly make fluorine ions to dissolve out in a chemical solution such as an electrolytic solution.

DESCRIPTION OF EMBODIMENTS

Hereinafter, specific embodiments of the present disclosure will now be described in detail, but the present disclosure is not limited to the following embodiments.

A copolymer of the present disclosure contains tetrafluoroethylene (TFE) unit and perfluoro(propyl vinyl ether) (PPVE) unit.

The copolymer (PFA) containing TFE unit and PPVE unit is used as a material for forming valves for controlling the pressure and the flow rate of fluid such as a chemical solution. Such valves are required to have abrasion resistance and excellent crack resistance in a chemical solution so as not to be damaged even when stress is applied by opening and closing the valve while being in contact with the chemical solution. Such valves may be used at high temperatures, and are thus required to have high-temperature rigidity, high-temperature tensile creep property, sealability at high temperatures, and mechanical strength. Moreover, since some of such valves have a complex structure having a thin portion, and thus the copolymer is also required to have good moldability.

Patent Literature 1 describes that, in a tetrafluoroethylene copolymer [TFE copolymer] comprising tetrafluoroethylene [TFE] and a perfluoro(alkyl vinyl ether) [PAVE], the content of PAVE unit is preferably more than 5% by mass from the viewpoint of increasing crack resistance, and more preferably 8% by mass or less from the viewpoint of heat resistance. However, a copolymer is not known that is capable of providing a formed article which is hardly cracked even when brought into contact with a chemical, that has excellent moldability, and that is capable of providing a formed article having excellent high-temperature mechanical property, high-temperature rigidity, high-temperature tensile creep property, high-temperature abrasion resistance, air low permeability, chemical solution low permeability, transparency, sealability at high temperatures, and water vapor low permeability.

It has been found that by suitably regulating the content of PPVE unit, the melt flow rate (MFR), and the number of functional groups of a copolymer containing TFE unit and PPVE unit, the moldability of the copolymer is significantly enhanced and, at the same time, a metal mold to be used for forming is hardly corroded. Further, it was been also found that the use of such a copolymer provides a formed article that is hardly cracked even when brought into contact with a chemical and that has excellent water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures. By using of the copolymer of the present disclosure, the performance of valves used at high temperatures is expected to be dramatically improved.

In addition, from the copolymer of the present disclosure, a thin coating layer can be formed by extrusion forming at a high rate on a core wire having a small diameter. Moreover, the obtained coating layer hardly corrodes the core wire. Thus, the copolymer of the present disclosure can be utilized not only as a material of a valve, but also in a broad range of applications such as an electric wire coating.

The copolymer of the present disclosure is a melt-fabricable fluororesin. Being melt-fabricable means that a polymer can be melted and processed by using a conventional processing device such as an extruder or an injection molding machine.

The content of the PPVE unit of the copolymer is 4.2 to 4.9% by mass with respect to the whole of the monomer units. The content of the PPVE unit of the copolymer is preferably 4.3% by mass or higher, more preferably 4.8% by mass or lower, more preferably 4.7% by mass or lower, and still more preferably 4.6% by mass or lower. An excessively large content of the PPVE unit of the copolymer results in poor air low permeability, 110° C. high-temperature rigidity, sealability at high temperatures, and water vapor low permeability. An excessively small content of the PPVE unit of the copolymer likely results in cracks when the formed article is brought into contact with a chemical, and results in poor mechanical strength at 150° C., 90° C. abrasion resistance, and transparency.

The content of the TFE unit of the copolymer is preferably 95.1 to 95.8% by mass, more preferably 95.2% by mass or higher, and most preferably 95.3% by mass or higher, and is more preferably 95.7% by mass or lower, with respect to the whole of the monomer units. An excessively small content of TFE unit of the copolymer possibly results in poor air low permeability, 110° C. high-temperature rigidity, sealability at high temperatures, and water vapor low permeability. An excessively large content of TFE unit of the copolymer likely results in cracks when the formed article is brought into contact with a chemical, and possibly results in poor mechanical strength at 150° C., 90° C. abrasion resistance, and transparency.

In the present disclosure, the content of each monomer unit in the copolymer is measured by a $^{19}F$-NMR method.

The copolymer can also contain a monomer unit derived from a monomer that is copolymerizable with TFE and PPVE. In this case, the content of the monomer unit copolymerizable with TFE and PPVE is, with respect to the whole of the monomer units of the copolymer, preferably 0 to 1.0% by mass, more preferably 0.05 to 0.7% by mass, and still more preferably 0.1 to 0.3% by mass.

The monomer copolymerizable with TFE and PPVE may include hexafluoropropylene (HFP), vinyl monomers represented by $CZ^1Z^2{=}CZ^3(CF_2)_nZ^4$ wherein $Z^1$, $Z^2$ and $Z^3$ are identical or different, and represent H or F; $Z^4$ represents H, F or Cl; and n represents an integer of 2 to 10, perfluoro (alkyl vinyl ether) [PAVE] represented by $CF_2{=}CF{-}ORf^1$ wherein $Rf^1$ is a perfluoroalkyl group having 1 to 8 carbon atoms (excluding PPVE), and alkyl perfluorovinyl ether derivatives represented by $CF_2{=}CF{-}OCH_2{-}Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the PPVE unit, and TFE/HFP/PPVE copolymer, and is more preferably a copolymer consisting only of the TFE unit and the PPVE unit.

The melt flow rate (MFR) of the copolymer is 19.0 to 27.0 g/10 min. The MFR of the copolymer is preferably 20.0 g/10 min or higher, more preferably 21.0 g/10 min or higher, still more preferably 22.0 g/10 min or higher, and most preferably 23.0 g/10 min or higher, and is preferably 26.9 g/10 min or lower, more preferably 26.0 g/10 min or lower, still more preferably 25.0 g/10 min or lower, especially preferably 24.0 g/10 min or lower, and most preferably 23.0 g/10 min or lower. Due to that the MFR of the copolymer is in the above range, the moldability of the copolymer is enhanced, and also a formed article can be obtained that is hardly cracked when brought into contact with a chemical, and that has excellent mechanical property at 150° C., 110° C. high-temperature rigidity, 90° C. abrasion resistance, air low permeability, high-temperature tensile creep property, and transparency.

In the present disclosure, the MFR is a value obtained as a mass (g/10 min) of the polymer flowing out from a nozzle having an inner diameter of 2.1 mm and a length of 8 mm per 10 min at 372° C. under a load of 5 kg using a melt indexer, according to ASTM D1238.

The MFR can be regulated by regulating the kind and amount of a polymerization initiator to be used in polymerizing monomers, the kind and amount of a chain transfer agent, and the like.

In the present disclosure, the number of functional groups per $10^6$ main-chain carbon atoms of the copolymer is 50 or less. The number of functional groups per $10^6$ main-chain carbon atoms of the copolymer is preferably 40 or less, more preferably 30 or less, still more preferably 20 or less, further still more preferably 15 or less, especially preferably 10 or less and most preferably 6 or less. Due to that the number of functional groups of the copolymer is in the above range, a metal mold is hardly corroded even when forming the copolymer by filling the metal mold with the copolymer, and a core wire is hardly corroded even when the copolymer is used as an electric wire coating. Also, a thin coating layer can be formed by extrusion forming at a high rate on a core wire having a small diameter. Moreover, a formed article can be obtained that has excellent air low permeability, chemical solution low permeability, and high-temperature tensile creep property, and that hardly make fluorine ions to dissolve out in a chemical solution such as an electrolytic solution. In particular, by suitably regulating the content of the PPVE unit, the melt flow rate (MFR), and the number of functional groups of the copolymer containing TFE unit and PPVE unit, a formed article exhibiting excellent low permeability to various chemical solutions such as dimethyl carbonate and methyl ethyl ketone can be obtained.

For identification of the kind of the functional groups and measurement of the number of the functional groups, infrared spectroscopy can be used.

Specifically, the number of functional groups is measured by the following method. First, the copolymer is formed by cold press into a film having a thickness of 0.25 to 0.30 mm. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional groups per $1\times10^6$ carbon atoms in the copolymer is calculated according to the following formula (A).

$$N=I\times K/t \quad \text{(A)}$$

I: absorbance

K: correction factor t: thickness of film (mm)

For reference, the absorption frequency, the molar absorption coefficient and the correction factor for some functional groups are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —CF═$CF_2$ | 1795 | 635 | 366 | $CF_2$═$CF_2$ |

Absorption frequencies of —$CH_2CF_2H$, —$CH_2COF$, —$CH_2COOH$, —$CH_2COOCH_3$ and —$CH_2CONH_2$ are lower by a few tens of kaysers (cm-1) than those of —$CF_2H$, —COF, —COOH free and —COOH bonded, —$COOCH_3$ and —$CONH_2$ shown in the Table, respectively.

For example, the number of functional groups —COF is the total number of a functional group determined from an absorption peak having an absorption frequency of 1,883 cm-1 derived from —$CF_2COF$ and the number of a functional group determined from an absorption peak having an absorption frequency of 1,840 cm-1 derived from —$CH_2COF$.

The functional groups are ones present on main chain terminals or side chain terminals of the copolymer, and ones present in the main chain or the side chains. The number of functional groups may be the total number of —CF═$CF_2$, —$CF_2H$, —COF, —COOH, —$COOCH_3$, —$CONH_2$ and —$CH_2OH$.

The functional groups are introduced to the copolymer by, for example, a chain transfer agent or a polymerization initiator used for the production of the copolymer. For example, in the case of using an alcohol as a chain transfer agent, or a peroxide having a structure of —$CH_2OH$ as a polymerization initiator, —$CH_2OH$ is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer of the present disclosure is preferably one which is subjected to the fluorination treatment. Further, the copolymer of the present disclosure preferably has —$CF_3$ terminal groups.

The melting point of the copolymer is preferably 295 to 315° C., more preferably 300° C. or higher, still more preferably 302° C. or higher, especially preferably 303° C. or higher, and most preferably 304° C. or higher, and is more preferably 310° C. or lower. Due to that the melting point is in the above range, there can be obtained the copolymer giving formed articles better in high-temperature mechanical property and sealability at high temperatures.

In the present disclosure, the melting point can be measured by using a differential scanning calorimeter [DSC].

The water vapor permeability of the copolymer is preferably 11.0 g·cm/$m^2$ or lower, more preferably 10.5 g·cm/$m^2$ or lower, and still more preferably 10.4 g·cm/$m^2$ or lower. Due to that the content of the PPVE unit, the melt flow rate (MFR), and the number of functional groups of the copolymer containing TFE unit and PPVE unit are suitably regulated, the copolymer has excellent water vapor low permeability. Hence, by using a formed article containing the copolymer of the present disclosure, for example, as a piping member (such as a valve) for transferring a chemical solution that should not be mixed with water, the permeation of water vapor from the outside to the piping member can be suppressed.

In the present disclosure, the water vapor permeability can be measured under the condition of a temperature of 95° C. and for 30 days. Specific measurement of the water vapor permeability can be carried out by a method described in Examples.

The air permeability coefficient of the copolymer is preferably 380 $cm^3$·mm/($m^2$·24 h·atm) or less. Due to that the content of PPVE unit, the melt flow rate (MFR), and the number of functional groups of the copolymer containing TFE unit and PPVE unit are suitably regulated, the copolymer of the present disclosure has excellent air low permeability.

In the present disclosure, the air permeability coefficient can be measured under the condition of a test temperature of 70° C. and a test humidity of 0% RH. Specific measurement of the air permeability coefficient can be carried out by a method described in Examples.

The electrolytic solution permeability of the copolymer is preferably 7.0 g·cm/$m^2$ or lower, and more preferably 6.7 g·cm/$m^2$ or lower. Due to that the content of the PPVE unit, the melt flow rate (MFR), and the number of functional groups of the copolymer containing TFE unit and PPVE unit are suitably regulated, the copolymer of the present disclosure has excellent electrolytic solution low permeability. That is, by using the copolymer of the present disclosure, a formed article that hardly makes a chemical solution such as an electrolytic solution to permeate can be obtained.

In the present disclosure, the electrolytic solution permeability can be measured under the condition of a temperature of 60° C. and for 30 days. Specific measurement of the electrolyte permeability can be carried out by a method described in Examples.

The methyl ethyl ketone (MEK) permeability of the copolymer is preferably 65.0 mg·cm/$m^2$·day or less. Due to that the content of the PPVE unit, the melt flow rate (MFR), and the number of functional groups of the copolymer containing TFE unit and PPVE unit are suitably regulated, the copolymer of the present disclosure has excellent MEK low permeability. That is, by using the copolymer of the present disclosure, a formed article that hardly makes a chemical solution such as MEK to permeate can be obtained.

In the present disclosure, the MEK permeability can be measured under the condition of a temperature of 60° C. and for 60 days. Specific measurement of the MEK permeability can be carried out by a method described in Examples.

In the copolymer of the present disclosure, the amount of fluorine ions dissolving out therefrom detected by an electrolytic solution immersion test is, in terms of mass, preferably 1.0 ppm or lower, more preferably 0.8 ppm or lower, and still more preferably 0.7 ppm or lower. Due to the amount of fluorine ions dissolving out is in the above range, the generation of gas such as HF in a non-aqueous electrolyte battery can be more suppressed, and the deterioration and the shortening of the service life of the battery performance of a non-aqueous electrolyte battery can be more suppressed.

In the present disclosure, the electrolytic solution immersion test can be carried out by preparing a test piece of the copolymer having a weight corresponding to that of 10 sheets of formed articles (15 mm×15 mm×0.2 mm) of the copolymer, and putting, in a thermostatic chamber of 80° C., a glass-made sample bottle in which the test piece and 2 g of dimethyl carbonate (DMC) and allowing the resultant to stand for 144 hours.

The storage elastic modulus (E') at 150° C. of the copolymer is preferably 90 MPa or higher and more preferably 100 MPa or higher, and is preferably 1,000 MPa or lower, more preferably 500 MPa or lower, and still more preferably 300 MPa or lower. Due to the storage elastic modulus (E') at 150° C. of the copolymer is in the above range, there can be obtained the copolymer giving formed articles which can keep on exhibiting a sufficient rebound resilience also at high temperatures for a long term, and having even better sealability at high temperatures.

The storage elastic modulus (E') can be measured by carrying out dynamic viscoelasticity measurement under the condition of a temperature-increasing rate of 2° C./min and a frequency of 10 Hz and in the range of 30 to 250° C. The storage elastic modulus (E') at 150° C. can be raised by regulating the content of the PPVE unit and the melt flow rate (MFR) of the copolymer.

The seal pressure at 150° C. of the copolymer is preferably 0.40 MPa or higher, more preferably 0.50 MPa or higher, and still more preferably 0.60 MPa or higher; and the upper limit is not limited, but may be 3.00 MPa or lower. The seal pressure at 150° C. of the copolymer can be raised by regulating the content of the PPVE unit, the melt flow rate (MFR) and the number of functional groups of the copolymer.

The seal pressure can be determined as follows. A test piece obtained from the copolymer is deformed at a compression deformation rate of 50%, allowed to stand as is at 150° C. for 18 hours, released from the compressed state, and allowed to stand at room temperature for 30 min, and thereafter, the height of the test piece (height of the test piece after being compressiblely deformed) is measured; and the seal pressure can be calculated by the following formula using the height of the test piece after being compressiblely deformed, and the storage elastic modulus (MPa) at 150° C.:

$$\text{seal pressure at } 150^\circ \text{ C. (MPa)} = (t_2 - t_1)/t_1 \times E'$$

$t_1$: an original height (mm) of a test piece before being compressiblely deformed×50%

$t_2$: a height (mm) of test piece after being compressiblely deformed

E': a storage elastic modulus (MPa) at 150° C.

The copolymer of the present disclosure preferably has a haze value of 13.0% or less, and more preferably 12.5% or less. Due to that the haze value is in the above range, for example, when the copolymer of the present disclosure is used to obtain a formed article such as a valve, a filter cage, a pipe, a joint, a bottle, a flow meter, or the like, it becomes very easy to observe the inside of the formed article with the naked eye, a camera, or the like, and thus it is very easy to check the flow rate and the residual quantity of the contents. The haze value can be lowered by regulating the content of the PPVE unit and the melt flow rate (MFR) of the copolymer. In the present disclosure, the haze value can be measured according to JIS K 7136.

The copolymer of the present disclosure preferably has a tensile strength at 150° C. of 15.5 MPa or higher, and more preferably 16.0 MPa or higher. Due to that the tensile strength at 150° C. is in the above range, even when the obtained formed article is used at high temperatures, deformation is suppressed, and the service life of the formed article can be extended. In addition, even when pressure is applied from a high-temperature fluid, deformation of and damage to the formed article are prevented, and thus a high-temperature fluid can be circulated at a high flow rate. In the present disclosure, tensile strength at 150° C. can be measured according to ASTM D638. The tensile strength can be increased by regulating the content of the PPVE unit, the melt flow rate (MFR), and the number of functional groups of the copolymer.

The copolymer of the present disclosure can be produced by a polymerization method such as suspension polymerization, solution polymerization, emulsion polymerization, or bulk polymerization. The polymerization method is preferably emulsion polymerization or suspension polymerization. In these polymerization methods, conditions such as temperature and pressure, and a polymerization initiator and other additives can be suitably set depending on the composition and the amount of the copolymer.

The polymerization initiator may be an oil-soluble radical polymerization initiator, or a water-soluble radical polymerization initiator.

The oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate, and di-2-ethoxyethyl peroxydicarbonate;
- peroxyesters such as t-butyl peroxyisobutyrate and t-butyl peroxypivalate;
- dialkyl peroxides such as di-t-butyl peroxide; and
- di[fluoro(or fluorochloro)acyl] peroxides.

The di[fluoro(or fluorochloro)acyl] peroxides include diacyl peroxides represented by $[(RfCOO)—]_2$ wherein Rf is a perfluoroalkyl group, an ω-hydroperfluoroalkyl group, or a fluorochloroalkyl group.

Examples of the di[fluoro(or fluorochloro)acyl]peroxides include di(ω-hydro-dodecafluorohexanoyl) peroxide, di(ω-hydro-tetradecafluoroheptanoyl) peroxide, di(ω-hydrohexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(O-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorotriacontafluorodocosanoyl) peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, percarbonic acid, and the like, organic peroxides such as disuccinoyl peroxide and diglutaroyl peroxide, and t-butyl permaleate and t-butyl hydroperoxide. A reductant such as a sulfite salt may be combined with a peroxide and used, in the amount of 0.1 to 20 times with respect to the peroxide.

In the polymerization, a surfactant, a chain transfer agent and a solvent may be used, which are conventionally known.

The surfactant may be a known surfactant, and, for example, nonionic surfactants, anionic surfactants, and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be present between carbon atoms). The amount of the surfactant to be added (with respect to water in the polymerization) is preferably 50 to 5,000 ppm.

Examples of the chain transfer agent include hydrocarbons such as ethane, isopentane, n-hexane, and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride, and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. Examples of the fluorosolvent include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$, and $CF_3CF_2CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$, and, among these, perfluoroalkanes are preferred. The amount of the fluorosolvent to be used is, from the viewpoint of suspendability and economic efficiency, preferably 10 to 100% by mass with respect to the aqueous medium.

The polymerization temperature is not limited, and may be 0 to 100° C. The polymerization pressure is suitably set depending on other polymerization conditions to be used such as the kind, the amount, and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then, in the case of obtaining the copolymer as a slurry by the polymerization reaction, the copolymer can be recovered by taking out the slurry from a reaction container, and cleaning and drying the slurry. The copolymer can be recovered in a shape of a powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder, or a tandem extruder and cutting the resultant into a predetermined length to form the copolymer into pellets. The extrusion temperature in the melt extrusion needs to be varied depending on the melt viscosity and the production method of the copolymer, and is preferably from the melting point of the copolymer +20° C. to the melting point of the copolymer +140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water at 30 to 200° C., steam at 100 to 200° C., or hot air at 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —$COOCH_3$, —$CH_2OH$, —COF, —$CF{=}CF_2$, and —$CONH_2$ and thermally relatively stable functional groups thereof, such as —$CF_2H$, can be converted to thermally very stable —$CF_3$. Consequently, the total number (number of functional groups) of —COOH, —$COOCH_3$, —$CH_2OH$, —COF, —$CF{=}CF_2$, —$CONH_2$, and —$CF_2H$ of the copolymer can be easily controlled in the above-mentioned range.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, and halogen fluorides (such as, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas, and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

A composition may be obtained by mixing the copolymer of the present disclosure and as required, other components. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents, and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube, and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer and non-fluorinated polymers.

A method of producing the composition includes a method of dry mixing the copolymer and the other components, and a method of previously mixing the copolymer and the other components by a mixer and then melt kneading the mixture by a kneader, melt extruder or the like.

The copolymer of the present disclosure or the above-mentioned composition can be used as a processing aid, a forming material and the like, but use as a molding material is suitable. There can also be utilized aqueous dispersions, solutions and suspensions of the copolymer of the present disclosure, and the copolymer/solvent-based materials; and these can be used for application of coating materials, encapsulation, impregnation, and casting of films. However, since the copolymer of the present disclosure has the above-mentioned properties, it is preferable to use the copolymer as the forming material.

Formed articles may be obtained by forming the copolymer of the present disclosure or the above composition.

A method of forming the copolymer or the composition is not limited, and includes injection molding, extrusion forming, compression molding, blow molding, transfer molding, rotomolding, and rotolining molding. As the forming method, among these, preferable are extrusion forming, compression molding, injection molding, and transfer molding; more preferable are injection molding, extrusion forming, and transfer molding form the viewpoint of being able to produce formed article in a high productivity, and still more preferable is injection molding. That is, it is preferable that the formed articles are extrusion formed articles, compression formed articles, injection molded articles, or transfer formed articles; and from the viewpoint of being able to produce formed articles in a high productivity, being injection molded articles, extrusion formed articles, or transfer formed articles is preferable, and being injection molded articles is still more preferable. By forming the copolymer of the present disclosure by injection molding, a thin visually attractive formed article can be obtained by forming at an extremely high injection rate.

The formed article containing the copolymer of the present disclosure may be, for example, a nut, a bolt, a joint, a film, a bottle, a gasket, an electric wire coating, a tube, a hose, a pipe, a valve, a sheet, a seal, a packing, a tank, a roller, a container, a cock, a connector, a filter housing, a filter cage, a flow meter, a pump, a wafer carrier, and a wafer box.

The copolymer of the present disclosure, the above composition and the above formed articles can be used, for example, in the following applications.

Food packaging films, and members for liquid transfer for food production apparatuses, such as lining materials of fluid transfer lines, packings, sealing materials and sheets, used in food production processes;

chemical stoppers and packaging films for chemicals, and members for chemical solution transfer, such as lining materials of liquid transfer lines, packings, sealing materials and sheets, used in chemical production processes;

inner surface lining materials of chemical solution tanks and piping of chemical plants and semiconductor factories; members for fuel transfer, such as 0 (square) rings, tubes, packings, valve stem materials, hoses and sealing materials, used in fuel systems and peripheral equipment of automobiles, and such as hoses and sealing materials, used in ATs of automobiles;

members used in engines and peripheral equipment of automobiles, such as flange gaskets of carburetors, shaft seals, valve stem seals, sealing materials and hoses, and other vehicular members such as brake hoses, hoses for air conditioners, hoses for radiators, and electric wire coating materials;

members for chemical transfer for semiconductor production apparatuses, such as O (square) rings, tubes, packings, valve stem materials, hoses, sealing materials, rolls, gaskets, diaphragms and joints;

members for coating and inks, such as coating rolls, hoses and tubes, for coating facilities, and containers for inks;

members for food and beverage transfer, such as tubes, hoses, belts, packings and joints for food and beverage, food packaging materials, and members for glass cooking appliances;

members for waste liquid transport, such as tubes and hoses for waste transport;

members for high-temperature liquid transport, such as tubes and hoses for high-temperature liquid transport;

members for steam piping, such as tubes and hoses for steam piping;

corrosion-proof tapes for piping, such as tapes wound on piping of decks and the like of ships;

various coating materials, such as electric wire coating materials, optical fiber coating materials, and transparent front side coating materials installed on the light incident side and back side lining materials of photoelectromotive elements of solar cells;

diaphragms and sliding members such as various types of packings of diaphragm pumps;

films for agriculture, and weathering covers for various kinds of roof materials, sidewalls and the like;

interior materials used in the building field, and coating materials for glasses such as non-flammable fireproof safety glasses; and lining materials for laminate steel sheets used in the household electric field.

The fuel transfer members used in fuel systems of automobiles further include fuel hoses, filler hoses, and evap hoses. The above fuel transfer members can also be used as fuel transfer members for gasoline additive-containing fuels, resistant to sour gasoline, resistant to alcohols, and resistant to methyl tertiary butyl ether and amines and the like.

The above chemical stoppers and packaging films for chemicals have excellent chemical resistance to acids and the like. The above chemical solution transfer members also include corrosion-proof tapes wound on chemical plant pipes.

The above formed article also includes vehicular radiator tanks, chemical solution tanks, bellows, spacers, rollers and gasoline tanks, waste solution transport containers, high-temperature liquid transport containers and fishery and fish farming tanks.

The above formed article further includes members used for vehicular bumpers, door trims and instrument panels, food processing apparatuses, cooking devices, water- and oil-repellent glasses, illumination-related apparatuses, display boards and housings of QA devices, electrically illuminated billboards, displays, liquid crystal displays, cell phones, printed circuit boards, electric and electronic components, sundry goods, dust bins, bathtubs, unit baths, ventilating fans, illumination frames and the like.

Due to that the formed articles containing the copolymer of the present disclosure are excellent in water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, are hardly cracked even when brought into contact with a chemical, and hardly make fluorine ions to dissolve out in a chemical solution such as an electrolytic solution, the formed articles containing the copolymer of the present disclosure can suitably be used as nuts, bolts, joints, packings, valves, cocks, connectors, filter housings, filter cages, flow meters, pumps, or the like. For example, the formed article can suitably be utilized as a piping member (in particular, a joint) to be used to transfer a chemical solution or as a flowmeter housing having a flow path for a chemical solution in a flowmeter. The piping member and the flow meter housing of the present disclosure has a small haze value, has excellent water vapor low permeability, mechanical property at 150° C., 110° C. high-temperature rigidity, 90° C. abrasion resistance, air low permeability, chemical solution low permeability, high-temperature tensile creep property, and sealability at high temperatures, and is also hardly cracked even when brought into contact with a chemical. Accordingly, the piping member and the flowmeter housing of the present disclosure have excellent inside-visibility and, especially in the flowmeter housing, enables the float inside to be easily observed with the naked eye, a camera, or the like and can suitably be used in measuring the flow rate of a chemical solution at approximately 150° C., and are hardly damaged even when a chemical is circulated. Moreover, the piping member and the flowmeter housing of the present disclosure do not corrode a metal mold to be used for forming, can be produced at an extremely high injection rate even when having a thin portion, and has an attractive appearance.

The formed articles containing the copolymer of the present disclosure do not corrode a metal mold, can be produced at an extremely high injection rate by injection molding even when having a thin portion, has excellent water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, are hardly cracked even when brought into contact with a chemical, hardly make fluorine ions to dissolve out in a chemical solution such as an electrolytic solution, and thus can suitably be used as members to the be compressed such as gaskets, packings, or the like.

The members to be compressed of the present disclosure, even when being deformed at a high compression deformation rate, exhibit a high seal pressure. The members to be compressed of the present disclosure can be used in a state of being compressed at a compression deformation rate of 10% or higher, and can be used in a state of being compressed at a compression deformation rate of 20% or higher or 25% or higher. By using the member to be compressed of the present disclosure by being deformed at such a high compression deformation rate, a certain rebound resilience can be retained for a long term, and the sealing property and the insulating property can be retained for a long term.

The members to be compressed of the present disclosure, even when being deformed at a high temperature and at a high compression deformation rate, exhibit a high storage elastic modulus, a large amount of recovery, and a high seal pressure. The members to be compressed of the present disclosure can be used at 150° C. or higher and in a state of being compression deformed at a compression deformation rate of 10% or higher, and can be used at 150° C. or higher and in a state of being compression deformed at a compression deformation rate of 20% or higher or 25% or higher. By using the member to be compressed of the present disclosure by being deformed at such a high temperature and at such a high compression deformation rate, a certain rebound resilience can be retained also at high temperatures for a long term, and the sealing property and the insulating property at high temperatures can be retained for a long term.

In the case where the members to be compressed are used in a state of being compressed, the compression deformation rate is a compression deformation rate of a portion having the highest compression deformation rate. For example, in the case where a flat member to be compressed is used in a state of being compressed in the thickness direction, the compression deformation rate is that in the thickness direction. Further, for example, in the case where a member to be compressed is used with only some portions of the member in a state of being compressed, the compression deformation rate is that of a portion having the highest compression deformation rate among compression deformation rates of the compressed portions.

The size and shape of the member to be compressed of the present disclosure may suitably be set according to applications, and are not limited. The shape of the members to be compressed of the present disclosure may be, for example, annular. The members to be compressed of the present disclosure may also have, in plan view, a circular shape, an elliptical shape, a corner-rounded square or the like, and may be a shape having a through hole in the central portion thereof.

It is preferable that the members to be compressed of the present disclosure are used as members constituting non-aqueous electrolyte batteries. Due to that the members to be compressed of the present disclosure are excellent in water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, and hardly make fluorine ions to dissolve out in an electrolytic solution, the members are especially suitable as members used in a state of being in contact with a non-aqueous electrolyte in the non-aqueous electrolyte batteries. That is, the members to be compressed of the present disclosure may also be ones having a liquid-contact surface with a non-aqueous electrolyte in the non-aqueous electrolyte batteries.

The members to be compressed of the present disclosure hardly make fluorine ions to dissolve out in a non-aqueous electrolyte. Therefore, by using the member to be compressed of the present disclosure, the rise in the fluorine ion concentration in a non-aqueous electrolyte can be suppressed. Consequently, by using the member to be compressed of the present disclosure, the generation of gases such as HF in a non-aqueous electrolyte can be suppressed, and the deterioration and the shortening of the service life of the battery performance of the non-aqueous electrolyte batteries can be suppressed.

From the viewpoint that the members to be compressed of the present disclosure can more suppress the generation of gas such as HF in a non-aqueous electrolyte, and can more suppress the deterioration and the shortening of the service life of the battery performance of the non-aqueous electrolyte batteries, the amount of fluorine ions dissolving out to be detected in an electrolytic solution immersion test is, in terms of mass, preferably 1.0 ppm or smaller, more preferably 0.8 ppm or smaller, and still more preferably 0.7 ppm or smaller. The electrolytic solution immersion test can be carried out by preparing a test piece having a weight equivalent to 10 sheets of a formed article (15 mm×15 mm×0.2 mm) using a member to be compressed, and putting, in a thermostatic chamber of 80° C., a glass-made sample bottle in which the test piece and 2 g of dimethyl carbonate (DMC) having been charged and allowing the sample bottle to stand for 144 hours.

The members to be compressed of the present disclosure hardly make water vapor to permeate. Therefore, by using the member to be compressed of the present disclosure, the permeation of water vapor from outside to secondary batteries can be suppressed. Consequently, by using the member to be compressed of the present disclosure, the deterioration and the shortening of the service life of the battery performance of the non-aqueous electrolyte batteries can be suppressed.

The water vapor permeability of the member to be compressed of the present disclosure is, from the viewpoint that the deterioration and the shortening of the service life of the battery performance of the non-aqueous electrolyte batteries can be more suppressed, preferably 11.0 g·cm/m$^2$ or lower, more preferably 10.5 g·cm/m$^2$ or lower, and still more preferably 10.4 g·cm/m$^2$ or lower. The water vapor permeability of the member to be compressed can be measured under the condition of a temperature of 95° C. and for 30 days.

The non-aqueous electrolyte batteries are not limited as long as being batteries having a non-aqueous electrolyte, and examples thereof include lithium ion secondary batteries and lithium ion capacitors. Members constituting the non-aqueous electrolyte batteries include sealing members and insulating members.

For the non-aqueous electrolyte, one or two or more of well-known solvents can be used such as propylene carbonate, ethylene carbonate, butylene carbonate, γ-butyllactone, 1,2-dimethoxyethane, 1,2-diethoxyethane, dimethyl carbonate, diethyl carbonate, and ethyl methyl carbonate. The non-aqueous electrolyte batteries may further have an electrolyte. The electrolyte is not limited, but may be $LiClO_4$, $LiAsF_6$, $LiPF_6$, $LiBF_4$, LiCl, LiBr, $CH_3SO_3Li$, $CF_3SO_3Li$, cesium carbonate and the like.

The members to be compressed of the present disclosure can suitably be utilized, for example, as sealing members such as sealing gaskets and sealing packings, and insulating members such as insulating gaskets and insulating packings. The sealing member are members to be used for preventing leakage of a liquid or a gas, or penetration of a liquid or a gas from the outside. The insulating members are members to be used for insulating electricity. The members to be compressed of the present disclosure may also be members to be used for the purpose of both sealing and insulation.

The members to be compressed of the present disclosure, due to being excellent in the heat resistance and remarkably excellent in the sealability at high temperatures, can suitably be used under an environment of becoming high temperatures. It is suitable for the members to be compressed of the present disclosure to be used, for example, in an environment where the maximum temperature becomes 40° C. or higher. It is suitable for the members to be compressed of the present disclosure to be used, for example, in an environment where the maximum temperature becomes 150° C. or higher. Examples of the case where the temperature of the members to be compressed of the present disclosure may become such high temperatures include the case where after a member to be compressed is installed in a state of being compressed to a battery, other battery members are installed to the battery by welding, and the case where a non-aqueous electrolyte battery generates heat.

Due to that the members to be compressed of the present disclosure are excellent in water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, and hardly make fluorine ions to dissolve out in an electrolyte, the members to be compressed can suitably be used as sealing members for non-aqueous electrolyte batteries or insulating members for non-aqueous electrolyte batteries. For example, in the charge time of batteries such as non-aqueous electrolyte secondary batteries, the temperature of the batteries temporarily becomes 40° C. or higher, specially temporarily becomes 150° C. or higher in some cases. Even when the members to be compressed of the present disclosure are used by being deformed at high temperatures and at a high compression deformation rate, and, moreover are brought into contact with non-aqueous electrolytes at high temperatures in batteries such as non-aqueous electrolyte batteries, a high rebound resilience is not impaired. Therefore, the members to be compressed of the present disclosure, in the case of being used as sealing members, have excellent sealing property and also at high temperatures, retain the sealing property for a long term. Further, the members to be compressed of the present disclosure, due to containing the above copolymer, have the excellent insulating property. Therefore, in the case of using the member to be compressed of the present disclosure as insulating members, the members firmly adhere to two or more electrically conductive members and prevent short circuits over a long term.

By forming the copolymer of the present disclosure by extrusion forming, a thin coating layer can be formed on a core wire having a small diameter at a high take-over speed without discontinuity of the coating even when the diameter of the core wire is small, also a coating layer having excellent electric properties can be formed, and thus the copolymer of the present disclosure can suitably be utilized as a material for forming an electric wire coating. Accordingly, a coated electric wire provided with a coating layer containing the copolymer of the present disclosure also has excellent electric properties because the coated electric wire barely has defects that causes sparks even when the diameter of the core wire is small and the coating layer is thin.

The coated electric wire has a core wire, and the coating layer installed on the periphery of the core wire and containing the copolymer of the present disclosure. For example, an extrusion formed article made by melt extruding the copolymer of the present disclosure on a core wire can be made into the coating layer. The coated electric wires are suitable to LAN cables (Ethernet cables), high-frequency transmission cables, flat cables, heat-resistant cables and the like, and particularly suitable to transmission cables such as LAN cables (Ethernet cables) and high-frequency transmission cables.

As a material of a core wire, for example, a metal conductor material such as copper or aluminum can be used. The core wire is preferably one having a diameter of 0.02 to 3 mm. The diameter of the core wire is more preferably 0.04 mm or more, still more preferably 0.05 mm or more and especially preferably 0.1 mm or more. The diameter of the core wire is more preferable 2 mm or less.

With regard to specific examples of the core wire, there may be used, for example, AWG (American Wire Gauge)-46 (solid copper wire of 40 μm in diameter), AWG-26 (solid copper wire of 404 μm in diameter), AWG-24 (solid copper wire of 510 μm in diameter), and AWG-22 (solid copper wire of 635 m in diameter).

The thickness of the coating layer is preferably 0.1 to 3.0 mm. It is also preferable that the thickness of the coating layer is 2.0 mm or smaller. By using the copolymer, the coating layer having a thickness of 0.5 mm or smaller, 0.4 mm or smaller, 0.3 mm or smaller, or 0.2 mm or smaller can be formed without any problem.

The high-frequency transmission cables include coaxial cables. The coaxial cables generally have a structure configured by laminating an inner conductor, an insulating coating layer, an outer conductor layer and a protective coating layer in order from the core part to the peripheral part. A formed article containing the copolymer of the present disclosure can suitably be utilized as the insulating coating layer containing the copolymer. The thickness of each layer in the above structure is not limited, but is usually: the diameter of the inner conductor is approximately 0.1 to 3 mm, the thickness of the insulating coating layer is approximately 0.3 to 3 mm; the thickness of the outer conductor layer is approximately 0.5 to 10 mm; and the thickness of the protective coating layer is approximately 0.5 to 2 mm.

The coating layer may be one containing cells, and is preferably one in which cells are homogeneously distributed.

The average cell size of the cells is not limited, and is, for example, preferably 60 μm or smaller, more preferably 45 μm or smaller, still more preferably 35 m or smaller, further still more preferably 30 μm or smaller, particularly preferable 25 μm or smaller, and further especially preferably 23 μm or smaller. Then, the average cell size is preferably 0.1 m or larger and more preferably 1 μm or larger. The average cell size can be determined by taking an electron microscopic image of an electric wire cross section, calculating the diameter of each cell by image processing and averaging the diameters.

The foaming ratio of the coating layer may be 20% or higher, and is more preferably 30% or higher, still more preferably 33% or higher, and further still more preferably 35% or higher. The upper limit is not limited, but is, for example, 80%. The upper limit of the foaming ratio may be 60%. The foaming ratio is a value determined as ((the specific gravity of an electric wire coating material−the specific gravity of the coating layer)/(the specific gravity of the electric wire coating material)×100. The foaming ratio can suitably be regulated according to applications, for example, by regulation of the amount of a gas, described later, to be injected in an extruder, or by selection of the kind of a gas dissolved.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TFE/HFP-based copolymer, a TFE/PAVE copolymer, a TFE/ethylene-based copolymer, a vinylidene fluoride-based polymer, a polyolefin resin such as polyethylene [PE], or polyvinyl chloride [PVC].

The coated electric wire can be produced, for example, by using an extruder, heating the copolymer, extruding the copolymer in a molten state on the core wire to thereby form the coating layer.

In formation of a coating layer, by heating the copolymer and introducing a gas into the copolymer in a molten state, the coating layer containing cells can be formed. The gas to be used may be, for example, a gas such as chlorodifluoromethane, nitrogen or carbon dioxide, or a mixture thereof. The gas may be introduced as a pressurized gas into the heated copolymer, or may be generated by mixing a chemical foaming agent in the copolymer. The gas dissolves in the copolymer in a molten state.

Also, the copolymer of the present disclosure can suitably be utilized as a material for products for high-frequency signal transmission.

The products for high-frequency signal transmission are not limited as long as being products to be used for transmission of high-frequency signals, and include (1) formed boards such as insulating boards for high-frequency circuits, insulating materials for connection parts and printed circuit boards, (2) formed articles such as bases of high-frequency vacuum tubes and antenna covers, and (3) coated electric wires such as coaxial cables and LAN cables. The products for high-frequency signal transmission can suitably be used in devices utilizing microwaves, particularly microwaves of 3 to 30 GHz, in satellite communication devices, cell phone base stations, and the like.

In the products for high-frequency signal transmission, the copolymer of the present disclosure can suitably be used as an insulator in view of a low dielectric loss tangent.

As the formed boards (1), printed wiring boards are preferable in that the good electric property is provided. The printed wiring boards are not limited, and examples include printed wiring boards of electronic circuits for cell phones, various computers, communication devices and the like. As the formed article (2), antenna covers are preferable in that the low dielectric loss is low.

By forming the copolymer of the present disclosure by injection molding at a high injection rate, a thin visually attractive sheet can be obtained at high productivity. Also, the formed articles containing the copolymer of the present disclosure are excellent in water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, are hardly cracked even when brought into contact with a chemical, and hardly make fluorine ions to dissolve out in water. Accordingly, the formed articles containing the copolymer of the present disclosure can suitably be utilized as films or sheets.

The films of the present disclosure are useful release films. The release films can be produced by forming the copolymer of the present disclosure by melt extrusion forming, calendering, press molding, casting, or the like. From the viewpoint uniform thin films can be obtained, the release films can be produced by melt extrusion forming.

The film of the present disclosure can be applied to the surface of a roll used in OA devices. The copolymer of the present disclosure is formed into required shapes such as sheets, films, or tubes, by extrusion forming, compression molding, press molding or the like, and can be used as surface materials for QA device rolls, QA device belts and the like. Thin-wall tubes and films can be produced particularly by melt extrusion forming.

The formed articles containing the copolymer of the present disclosure are excellent in water vapor low permeability, mechanical property at 150° C., 110° C. high-temperature rigidity, 90° C. abrasion resistance, air low permeability, chemical solution low permeability, high-temperature tensile creep property, and transparency, are also hardly cracked even when brought into contact with a chemical, and thus can be utilized as bottles or tubes. The bottle or the tube of the present disclosure enables the contents to be easily viewed, and is hardly damaged during use.

The copolymer of the present disclosure can be formed by injection molding at an extremely high injection rate even when the formed article has a thin portion, and hardly corrodes a metal mold to be used for forming. Moreover, the obtained formed article has an excellent appearance, has excellent water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, and is also hardly cracked even when brought into contact with a chemical. Accordingly, the copolymer of the present disclosure can suitably be utilized as a valve. The valve containing the copolymer of the present disclosure can be produced without corroding a metal mold, at low cost, and, moreover, at extremely high productivity, also, is hardly damaged even when opened and closed highly frequently, and has excellent water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures. The valve of the present disclosure has excellent water vapor low permeability, mechanical property at 150° C., 110° C. high-temperature rigidity, 90° C. abrasion resistance, air low permeability, chemical solution low permeability, high-temperature tensile creep property, transparency, and sealability at high temperatures, and thus can suitably be used to control, for example, a fluid at 100° C. or higher, in particular approximately 150° C. In the valve of the present disclosure, at least the fluid-contacting part can be composed of the copolymer. Also, the valve of the present disclosure may be a valve having a housing containing the copolymer.

So far, embodiments have been described above, but it is to be understood that various changes and modifications of patterns and details may be made without departing from the subject matter and scope of the claims.

According to the present disclosure, there is provided a copolymer comprising tetrafluoroethylene unit and perfluoro(propyl vinyl ether) unit, wherein the copolymer has a content of perfluoro(propyl vinyl ether) unit of 4.2 to 4.9% by mass with respect to the whole of the monomer units, a melt flow rate at 372° C. of 19.0 to 27.0 g/10 min, and the number of functional groups of 50 or less per $10^6$ main-chain carbon atoms.

The copolymer of the present disclosure preferably has a melt flow rate at 372° C. of 20.0 to 25.0 g/10 min.

In the copolymer of the present disclosure, the number of functional groups is preferably 20 or less per $10^6$ main-chain carbon atoms.

According to the present disclosure, an injection molded article comprising the above copolymer is further provided.

According to the present disclosure, a coated electric wire having a coating layer comprising the above copolymer is further provided.

According to the present disclosure, a formed article comprising above the copolymer, wherein the formed article is a valve, a gasket, a filter cage, a joint, or an electric wire coating is further provided.

EXAMPLES

The embodiments of the present disclosure will be described by way of Examples as follows, but the present disclosure is not limited only to the Examples.

Each numerical value in the Examples was measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was allowed to flow out from a nozzle having an inner diameter of 2.1 mm and a length of 8 mm at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Number of Functional Groups)

Pellets of a copolymer was formed by cold press into a film of 0.25 to 0.30 mm in thickness by cold press. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that was completely fluorinated and had no functional groups was obtained. From an absorption peak of a specific functional group observed on this difference spectrum, the number N of functional groups per $1\times10^6$ carbon atoms in the sample was calculated according to the following formula (A):

$$N=I\times K/t \tag{A}$$

I: absorbance

K: correction factor t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —CF═$CF_2$ | 1795 | 635 | 366 | $CF_2$═$CF_2$ |

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corporation); and the melting point was determined from a melting curve peak observed in the second temperature raising step.

Example 1

49.0 L of pure water was charged in a 174 L-volume autoclave; nitrogen replacement was sufficiently carried out; thereafter, 40.7 kg of perfluorocyclobutane, 1.27 kg of perfluoro(propyl vinyl ether) (PPVE) and 2.88 kg of methanol were charged; and the temperature in the system was held at 35° C. and the stirring speed was held at 200 rpm. Then, tetrafluoroethylene (TFE) was introduced under pressure up to 0.64 MPa, and thereafter 0.041 kg of a 50% methanol solution of di-n-propyl peroxydicarbonate was charged to initiate polymerization. Since the pressure in the system decreased along with the progress of the polymerization, TFE was continuously supplied to make the pressure constant, and 0.045 kg of PPVE was added for every 1 kg of TFE supplied and the polymerization was continued for 17.5 hours. TFE was released to return the pressure in the autoclave to the atmospheric pressure, and thereafter, an obtained reaction product was washed with water and dried to obtain 30 kg of a powder.

The obtained powder was melt extruded at 360° C. with a screw extruder (trade name: PCM46, manufactured by Ikegai Corp) to obtain pellets of a TFE/PPVE copolymer. The PPVE content of the obtained pellets was measured by the method described above. The results are shown in Table 3.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and vacuumizing creation was carried out once every 1 hour, the reaction was carried out at a temperature of 210° C. for 10 hours. After the reaction was finished, the reactor was replaced sufficiently by $N_2$ gas to finish the fluorination reaction. By using the fluorinated pellets, the above physical properties were measured by the methods described above. The results are shown in Table 3.

Example 2

Fluorinated pellets were obtained as in Example 1, except for changing the amount of PPVE to 1.33 kg, changing the amount of methanol to 3.03 kg, and adding 0.046 kg of PPVE for every 1 kg of TFE supplied. The results are shown in Table 3.

Example 3

Fluorinated pellets were obtained as in Example 1, except for changing the amount of PPVE to 1.38 kg, changing the amount of methanol to 3.26 kg, adding 0.047 kg of PPVE for every 1 kg of TFE supplied, and changing the polymerization time to 18 hours. The results are shown in Table 3.

Example 4

Fluorinated pellets were obtained as in Example 1, except for changing the amount of PPVE to 1.44 kg, changing the amount of methanol to 3.53 kg, adding 0.048 kg of PPVE for every 1 kg of TFE supplied, and changing the polymerization time to 18 hours. The results are shown in Table 3.

Example 5

Fluorinated pellets were obtained as in Example 1, except for changing the amount of PPVE to 1.50 kg, changing the amount of methanol to 2.75 kg, adding 0.049 kg of PPVE for every 1 kg of TFE supplied, changing the polymerization time to 18 hours, changing the raised temperature of the vacuum vibration-type reactor to 170° C., and changing the reaction condition to 170° C. and 5 hours. The results are shown in Table 3.

Comparative Example 1

Fluorinated pellets were obtained as in Example 1, except for changing the amount of pure water to 34.0 L, perfluorocyclobutane to 30.4 kg, PPVE to 0.86 kg, and methanol to 1.50 kg, introducing TFE under pressure up to 0.60 MPa, adding 0.060 kg of a 50% methanol solution of di-n-propyl peroxydicarbonate, adding 0.046 kg of PPVE for every 1 kg of TFE supplied, changing the polymerization time to 21 hours, changing the raised temperature of the vacuum vibration-type reactor to 160° C., and changing the reaction condition to 160° C. and 5 hours. The results are shown in Table 3.

Comparative Example 2

Non-fluorinated pellets were obtained as in Example 1, except for changing the amount of PPVE to 1.44 kg, changing the amount of methanol to 3.81 kg, and adding 0.048 kg of PPVE for every 1 kg of TFE supplied. The results are shown in Table 3.

Comparative Example 3

51.8 L of pure water was charged in a 174 L-volume autoclave; nitrogen replacement was sufficiently carried out, 40.9 kg of perfluorocyclobutane, 1.79 kg of perfluoro(propyl vinyl ether) (PPVE) and 6.61 kg of methanol were added; and the temperature in the system was held at 35° C. and the stirring speed was held at 200 rpm. Then, tetrafluoroethylene (TFE) was introduced under pressure up to 0.64 MPa, and thereafter 0.051 kg of a 50% methanol solution of di-n-propyl peroxydicarbonate was charged to initiate polymerization. Since the pressure in the system decreased along with the progress of the polymerization, TFE was continuously supplied to make the pressure constant, and 0.042 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to obtain 41.0 kg of a powder.

By using the obtained powder, the fluorination reaction was carried out as in Example 1 to obtain fluorinated pellets. The results are shown in Table 3.

Comparative Example 4

Fluorinated pellets were obtained as in Comparative Example 3, except for changing the charge amount of PPVE to 2.24 kg, changing the charge amount of methanol to 4.25 kg, and adding 0.049 kg of PPVE for every 1 kg of TFE supplied. The results are shown in Table 3.

Comparative Example 5

Fluorinated pellets were obtained as in Comparative Example 3, except for changing the charge amount of PPVE to 2.53 kg, changing the charge amount of methanol to 4.78 kg, and adding 0.055 kg of PPVE for every 1 kg of TFE supplied, to obtain 41.0 kg of a dry powder. The results are shown in Table 3.

TABLE 3

| | PPVE content (% by mass) | MFR (g/10 min) | Number of functional groups (groups/C10$^6$) | Melting point (° C.) |
|---|---|---|---|---|
| Example 1 | 4.3 | 20.0 | <6 | 304 |
| Example 2 | 4.4 | 21.0 | <6 | 304 |
| Example 3 | 4.5 | 23.0 | <6 | 304 |
| Example 4 | 4.6 | 25.0 | <6 | 304 |
| Example 5 | 4.7 | 20.0 | 29 | 304 |
| Comparative Example 1 | 4.4 | 29.0 | 42 | 304 |
| Comparative Example 2 | 4.6 | 24.1 | 282 | 304 |
| Comparative Example 3 | 4.0 | 25.0 | <6 | 305 |
| Comparative Example 4 | 4.7 | 17.6 | <6 | 304 |
| Comparative Example 5 | 5.2 | 25.0 | <6 | 302 |

The description of "<6" in Table 3 means that the number of functional groups is less than 6.

Then, by using the obtained pellets, the following properties were evaluated. The results are shown in Table 4-1 and Table 4-2.

(Chemical Solution Immersion Crack Test)

Approximately 50 g of the pellets were charged in a metal mold (inner diameter: 120 mm, height: 38 mm), and in that state, melted by hot plate press at 360° C. for 20 min, thereafter water-cooled under a pressure of 1 MPa to thereby prepare a formed article of approximately 2 mm in thickness. The obtained sheet was punched out by using a rectangular dumbbell of 13.5 mm×38 mm to obtain 3 test pieces. A notch was formed in the middle of a long side of the each obtained test piece according to ASTM D1693 by a blade of 19 mm×0.45 mm. Three notched test pieces and 25 g of an aqueous 40% by mass tetrabutylammonium solution were put in a 100 mL polypropylene bottle, and heated in an electric furnace at 90° C. for 20 hours, and then the notched test pieces were taken out. Then, the three notched test pieces were attached to a stress crack test jig according to ASTM D1693, and heated in an electric furnace at 150° C. for 24 hours, then the notches and the surrounding portions were visually observed, and the number of cracks was counted.

Good: number of cracks being 0

Poor: number of cracks being 1 or more (Water Vapor Permeability)

By using pellets and a heat press molding machine, a sheet-shape test piece of approximately 0.2 mm in thickness was prepared. 18 g of water was put in a test cup (permeation area: 12.56 cm$^2$), and the test cup was covered with the sheet-shape test piece; and a PTFE gasket was pinched and fastened to hermetically close the test cup. The sheet-shape test piece was brought into contact with water, and held at a temperature of 95° C. for 30 days, and thereafter, the test cup was taken out and allowed to stand at room temperature for 2 hours; thereafter the amount of the mass lost was measured. The water vapor permeability (g·cm/m$^2$) was determined by the following formula.

Water vapor permeability (g·cm/m$^2$)=the amount of the mass lost (g)×the thickness of the sheet-shape test piece (cm)/the permeation area (m$^2$)

(Storage Elastic Modulus (E'))

The storage elastic modulus was determined by carrying out a dynamic viscoelasticity measurement using a DVA-220 (manufactured by IT Keisoku Seigyo K.K.). By using, as a sample test piece, a heat press molded sheet of 25 mm in length, 5 mm in width and a 0.2 mm in thickness, the measurement was carried out under the condition having a temperature-increasing rate of 2° C./min and a frequency of 10 Hz, and in the range of 30° C. to 250° C., and the storage elastic modulus (MPa) at 150° C. was identified.

(Amount of Recovery)

The amount of recovery was measured according to a method described in ASTM D395 or JIS K6262:2013.

Approximately 2 g of the pellets were put in a metal mold (inner diameter: 13 mm, height: 38 mm), and in that state, melted by hot plate press at 370° C. for 30 min, thereafter water-cooled under a pressure of 0.2 MPa (resin pressure) to thereby prepare a formed article of approximately 8 mm in height. Thereafter, the obtained molded article was cut to prepare a test piece of 13 mm in outer diameter and 6 mm in height. The prepared test piece was compressed to a compression deformation rate of 50% (that is, the test piece of 6 mm in height was compressed to a height of 3 mm) at a normal temperature by using a compression device. Then, the compressed test piece being fixed on the compression device was allowed to stand still in an electric furnace at 150° C. for 18 hours. The compression device was taken out from the electric furnace, and cooled to room temperature; thereafter the test piece was dismounted. The collected test piece was allowed to stand at room temperature for 30 min, and the height of the collected test piece was measured and the amount of recovery was determined by the following formula.

$$\text{Amount of recovery (mm)} = t_2 - t_1$$

$t_1$: a height of a spacer (mm)

$t_2$: a height of the test piece dismounted from the compression device (mm)

In the above test, $t_1$ was 3 mm.

(Seal Pressure at 150° C.)

The seal pressure at 150° C. was determined from the result of the compression test at 150° C. and the result of the storage elastic modulus measurement at 150° C. by the following formula:

$$\text{Seal pressure at 150° C. (MPa)} = (t_2 - t_1)/t_1 \times E'$$

$t_1$: the height of a spacer (mm)

$t_2$: the height of test piece dismounted from the compression device (mm)

E': the storage elastic modulus at 150° C. (MPa)

(Haze Value)

By using pellets and a heat press molding machine, a sheet of approximately 1.0 mm in thickness was prepared. The sheet was immersed in a quartz cell filled with pure water, and the haze value was measured according to JIS K 7136 using a haze meter (trade name: NDH 7000SP, manufactured by NIPPON DENSHOKU INDUSTRIES CO., LTD.).

(Injection Moldability)

Conditions

The copolymer was injection-molded by using an injection molding machine (SE50EV-A, manufactured by Sumitomo Heavy Industries, Ltd.) set at a cylinder temperature of 390° C., a metal mold temperature of 220° C., and an injection rate of 100 mm/s. A metal mold (4 cavities of 15 mm×15 mm×1 mmt) obtained by Cr-plating HPM38 was used. The obtained four injection molded articles were observed and evaluated according to the following criteria. The presence/absence of surface roughness was checked by touching the surface of the injection molded articles.

3: The entire surface of the four injection molded articles was smooth.

2: In one of the four injection molded articles, roughness was confirmed on the surface within the region of 1 cm of the portion where the gate of the metal mold was positioned.

1: In two to four of the four injection molded articles, roughness was confirmed on the surface within the region of 1 cm of the portion where the gate of the metal mold was positioned.

0: Roughness was observed on the entire surface of the four injection molded articles.

(Tensile Strength (TS) at 150° C.)

Tensile strength at 150° C. was measured according to ASTM D638.

(Electrolytic Solution Immersion Test)

Approximately 5 g of the pellets were charged in a metal mold (inner diameter: 120 mm, height: 38 mm), and in that state, melted by hot plate press at 370° C. for 20 min, thereafter water-cooled under a pressure of 1 MPa (resin pressure) to thereby prepare a formed of approximately 0.2 mm in thickness. Thereafter, by using the obtained formed article, test pieces of 15-mm square were prepared.

10 sheets of the obtained test pieces and 2 g of dimethyl carbonate (DMC) were put in a 20-mL glass sample bottle, and the cap of the sample bottle was closed. The sample bottle was put in a thermostatic chamber at 80° C., and allowed to stand for 144 hours to thereby immerse the test pieces in DMC. Thereafter, the sample bottle was taken out from the thermostatic chamber, and cooled to room temperature; then, the test pieces were taken out from the sample bottle. DMC remaining after the test pieces were taken out was allowed to be air-dried in the sample bottle put in a room controlled to be a temperature of 25° C. for 24 hours; and 2 g of ultrapure water was added. The obtained aqueous solution was transferred to a measuring cell of an ion chromatograph system; and the amount of fluorine ions in the aqueous solution was measured by an ion chromatograph system (manufactured by Thermo Fisher Scientific Inc., Dionex ICS-2100).

(Metal Mold Corrosion Test)

20 g of the pellets were put in a glass container (50-ml screw vial), and a metal post (5-mm square shape, length of 30 mm) formed of HPM38 (Cr-plated) or HPM38 (Ni-plated) was hung in the glass container so as not to be in contact with the pellets. Then, the glass container was covered with a lid made of aluminum foil. The glass container was put in an oven as is and heated at 380° C. for 3 hours. Thereafter, the heated glass container was taken out from the oven, and cooled to room temperature; and the degree of corrosion of the surface of the metal post was visually observed. The degree of corrosion was judged according to the following criteria.

Good: no corrosion observed

Fair: corrosion slightly observed

Poor: corrosion observed (Coating Discontinuity and Spark)

Extrusion coating in the following coating thickness was carried out on a copper conductor of 0.50 mm in conductor diameter by a 30-mmφ electric wire coating forming machine (manufactured by Tanabe Plastics Machinery Co., Ltd.), to obtain a coated electric wire. The extrusion conditions for electric wire coating were as follows:

a) Core conductor: 0.50 mm in conductor diameter b) Coating thickness: 0.15 mm c) Coated electric wire diameter: 0.80 mm d) Electric wire take-over speed: 150 m/min e) Extrusion condition:

Cylinder screw diameter=30 mm, a single-screw extruder of L/D=22

Die (inner diameter)/tip (outer diameter)=8.0 mm/5.0 mm Set temperature of extruder: barrel section C-1 (330° C.), barrel section C-2 (360° C.), barrel section C-3 (375° C.), head section H (390° C.), die section D-1 (405° C.), die section D-2 (395° C.). Set temperature for preheating core wire: 80° C.

(Spark)

A spark tester (DENSOK HIGH FREQ SPARK TESTER) was installed online on an electric wire coating line, and the presence/absence of defects of the electric wire coating was evaluated at a voltage of 1,500 V. The case where no spark was generated in 1-hour continuous forming was determined as passing (Good), and the case where a spark was detected therein was determined as rejected (Poor).

(Coating Discontinuity)

Electric wire coating forming was continuously carried out; and the case where coating discontinuity occurred once or more in 1 hour was determined as poor (Poor) in continuous forming, and the case where no coating discontinuity occurred was determined as fair (Good) in continuous forming.

(Core Wire Corrosion Test)

Extrusion coating in the following coating thickness was carried out on a copper conductor of 0.812 mm in conductor diameter by a 30-mmφ electric wire coating forming machine (manufactured by Tanabe Plastics Machinery Co., Ltd.), to obtain a coated electric wire. The extrusion conditions for the electric wire coating were as follows:

a) Core conductor: mild steel wire conductor diameter: 0.812 mm (AWG20)
b) Coating thickness: 0.9 mm
c) Coated electric wire diameter: 2.6 mm
d) Electric wire take-over speed: 3 m/min
e) Extrusion condition:
   Cylinder screw diameter=30 mm, a single-screw extruder of L/D=22
   Die (inner diameter)/tip (outer diameter)=26.0 mm/8.0 mm Set temperature of the extruder: barrel section C-1 (330° C.), barrel section C-2 (350° C.), barrel section C-3 (370° C.), head section H (380° C.), die section D-1 (380° C.), die section D-2 (380° C.), Set temperature for preheating core wire: 80° C.

The coated electric wire formed under the above forming conditions was cut out so as to have a length of 20 cm, and was allowed to stand still in a thermohygrostatic chamber (manufactured by Formosa Advanced Technologies Co., Ltd., Junior SD-01) at 60° C. at a humidity of 95% for 2 weeks, then the coating layer was removed to expose the conductor, and the surface of the conductor was visually observed and evaluated according to the following criteria.

Good: no corrosion observed

Poor: corrosion observed (Abrasion Test)

By using pellets and a heat press molding machine, a sheet-shape test piece of approximately 0.2 mm in thickness was prepared, and a test piece having 10 cm×10 cm was cut out therefrom. The prepared test piece was fixed to a test bench of a Taber abrasion tester (No. 101 Taber type abrasion tester with an option, manufactured by YASUDA SEIKI SEISAKUSHO, LTD.), and the abrasion test was carried out using the Taber abrasion tester under the condition of a test piece surface temperature of 90° C., a load of 500 g, an abrasion wheel CS-10 (rotationally polished in 20 rotations with an abrasive paper #240), and a rotation rate of 60 rpm. The weight of the test piece after 1,000 rotations was measured, and the same test piece was further subjected to the test of 3,000 rotations, and then the weight of the test piece was measured. The abrasion loss was determined by the following formula.

$$\text{Abrasion loss (mg)}=M1-M2$$

M1: weight of test piece after 1,000 rotations (mg)

M2: weight of test piece after 3,000 rotations (mg)

(Air Permeability Coefficient)

By using pellets and a heat press molding machine, a sheet-shape test piece of approximately 0.1 mm in thickness was prepared. By using the obtained test piece, air permeability was measured with a differential pressure type gas permeation meter (L100-5000 gas permeability meter, manufactured by Systech Illinois) according to the method described in JIS K7126-1:2006. The air permeability value at a permeation area of 50.24 $cm^2$ at a test temperature of 70° C. at a test humidity of 0% RH was obtained. The obtained air permeability and the test piece thickness were used to calculate the air permeability coefficient from the following equation.

$$\text{Air permeability coefficient }(cm^3\cdot mm/(m^2\cdot 24\ h\cdot atm))=GTR\times d$$

GTR: air permeability ($cm^3/(m^2\cdot 24\ h\cdot atm)$)

d: test piece thickness (mm)

(Electrolyte Permeability)

By using pellets and a heat press molding machine, a sheet of approximately 0.2 mm in thickness was prepared. 10 g of dimethyl carbonate (DMC) was put in a test cup (permeation area: 12.56 $cm^2$), and the test cup was covered with the sheet-shape test piece; and a PTFE gasket was pinched and fastened to hermetically close the test cup. The sheet-shape test piece was brought into contact with the DMC, and held at a temperature of 60° C. for 30 days, and thereafter, the test cup was taken out and allowed to stand at room temperature for 1 hour; thereafter, the amount of the mass lost was measured. The DMC permeability ($g\cdot cm/m^2$) was determined by the following formula.

$$\text{Electrolytic solution permeability }(g\cdot cm/m^2)=\text{the amount of the mass lost (g)}\times\text{the thickness of the sheet-shape test piece (cm)/the permeation area }(m^2)$$

(Methyl Ethyl Ketone (MEK) Permeability)

By using pellets and a heat press molding machine, a sheet of approximately 0.1 mm in thickness was prepared. 10 g of MEK was put in a test cup (permeation area: 12.56 $cm^2$), and the test cup was covered with the sheet-shape test piece; and a PTFE gasket was pinched and fastened to hermetically close the test cup. The sheet-shape test piece was brought into contact with MEK, and held at a temperature of 60° C. for 60 days, and thereafter the test cup was taken out and allowed to stand at room temperature for 1 hours; thereafter, the amount of the mass lost was measured. MEK permeability ($mg\cdot cm/m^2\cdot day$) was determined by the following formula:

$$\text{MEK permeability }(mg\cdot cm/m^2\cdot day)=[\text{the amount of mass lost (mg)}\times\text{the thickness of the sheet-shape test piece (cm)}]/[\text{the permeation area }(m^2)\cdot\text{number of days (day)}]$$

(Rate of Deflection at 110° C. Under Load)

By using pellets and a heat press molding machine, a sheet of approximately 4.2 mm in thickness was prepared, and a test piece having 80×10 mm was cut out therefrom and heated in an electric furnace at 100° C. for 20 hours. Except that the obtained test piece was used, a test was carried out according to the method described in JIS K-K 7191-1 with a heat distortion tester (manufactured by YASUDA SEIKI SEISAKUSHO, LTD.) under the condition of a test temperature of 30 to 150° C., a temperature-increasing rate of 120° C./hour, a bending stress of 1.8 MPa, and a flatwise method. The rate of deflection under load was determined by the following formula. A sheet, the rate of deflection at 110° C. under load of which is small, has excellent rigidity at a high temperature of 110° C.

$$\text{Rate of deflection under load (\%)}=a2/a1\times 100$$

a1: test piece before test (mm)

a2: amount of deflection at 110° C. (mm)

(Tensile Creep Test)

Tensile creep strain was measured using TMA-7100 manufactured by Hitachi High-Tech Science Corporation. By using pellets and a heat press molding machine, a sheet of approximately 1.0 mm in thickness was prepared, and a sample having a width of 2 mm and a length of 22 mm was prepared from the sheet. The sample was attached to the measurement jigs, with the distance between the jigs being 10 mm. A load was applied to the sample such that the cross-sectional load was 2.41 N/mm$^2$, the sample was allowed to stand at 240° C., the displacement (mm) of the length of the sample from 90 minutes after the beginning of the test to 300 minutes after the beginning of the test was measured, and the ratio of the displacement (mm) of the length to the initial sample length (10 mm) (tensile creep strain (%)) was calculated. A sheet, the tensile creep strain (%) of which measured under the condition of a temperature of 240° C. and for 300 minutes is small, is hardly elongated even when a tensile load is applied in an extremely high-temperature environment, and has excellent high temperature tensile creep property.

(Dielectric Loss Tangent)

By melting the pellets, a cylindrical test piece of 2 mm in diameter was prepared. The prepared test piece was set in a cavity resonator for 6 GHz, manufactured by Kanto Electronic Application and Development Inc., and the dielectric loss tangent was measured with a network analyzer manufactured by Agilent Technologies Inc. By analyzing the measurement result by analysis software "CPMA", manufactured by Kanto Electronic Application and Development Inc., on PC connected to the network analyzer, the dielectric loss tangent (tan δ) at 20° C. at 6 GHz was determined.

TABLE 4

| | Chemical immersion crack test | Water vapor permeability (g · cm/m$^2$) | 150° C. Storage elastic modulus (MPa) | Amount of recovery (mm) | 150° C. Seal pressure (MPa) | Haze value (%) | Injection moldability | 150° C. Tensile strength (MPa) | Electrolytic solution immersion test Amount of fluorine ions dissolving out (ppm by mass) | Metal mold corrosion test HPM38 (Cr-plated) | HPM38 (Ni-plated) |
|---|---|---|---|---|---|---|---|---|---|---|---|
| Example 1 | Good | 9.6 | 109 | 0.021 | 0.76 | 12.4 | 1 | 16.0 | 0.6 | Good | Good |
| Example 2 | Good | 9.7 | 104 | 0.020 | 0.69 | 12.3 | 2 | 16.0 | 0.6 | Good | Good |
| Example 3 | Good | 9.7 | 104 | 0.018 | 0.62 | 12.3 | 3 | 15.5 | 0.6 | Good | Good |
| Example 4 | Good | 9.6 | 102 | 0.017 | 0.58 | 12.4 | 3 | 15.5 | 0.6 | Good | Good |
| Example 5 | Good | 10.4 | 94 | 0.018 | 0.56 | 11.8 | 1 | 16.0 | 0.6 | Good | Good |
| Comparative Example 1 | Poor | 9.1 | 110 | 0.016 | 0.59 | 13.0 | 3 | 15.0 | 0.7 | Good | Good |
| Comparative Example 2 | Good | 9.8 | 101 | 0.014 | 0.47 | 12.3 | 3 | 15.5 | 1.6 | Poor | Poor |
| Comparative Example 3 | Poor | 8.5 | 121 | 0.021 | 0.85 | 13.2 | 3 | 15.0 | 0.6 | Good | Good |
| Comparative Example 4 | Good | 10.8 | 93 | 0.019 | 0.59 | 11.5 | 0 | 17.0 | 0.6 | Good | Good |
| Comparative Example 5 | Good | 10.9 | 89 | 0.013 | 0.39 | 11.7 | 3 | 15.5 | 0.6 | Good | Good |

| | Electric wire coating property Core wire corrosion test | Coating discontinuity | Spark | 90° C. Abrasion loss (mg) | Air permeability coefficient cm$^3$ · mm/(m$^2$ · 24 h · atm) | Electrolytic solution permeability (g · cm/m$^2$) | MEK permeability (mg · cm/m$^2$ · day) | Rate of deflection at 110° C. under load (%) | 240° C. Tensile creep strain (%) | Dielectric tangent |
|---|---|---|---|---|---|---|---|---|---|---|
| Example 1 | Good | Good | Good | 22.0 | 359 | 6.5 | 61.9 | 66% | 2.15 | 0.00036 |
| Example 2 | Good | Good | Good | 22.1 | 363 | 6.5 | 61.9 | 66% | 2.22 | 0.00036 |
| Example 3 | Good | Good | Good | 22.4 | 362 | 6.4 | 61.7 | 66% | 2.29 | 0.00036 |
| Example 4 | Good | Good | Good | 22.7 | 363 | 6.4 | 61.5 | 66% | 2.36 | 0.00036 |
| Example 5 | Good | Good | Good | 21.1 | 378 | 6.7 | 64.0 | 67% | 2.43 | 0.00043 |
| Comparative Example 1 | Good | Good | Good | 24.3 | 350 | 6.3 | 60.5 | 65% | 2.22 | 0.00045 |
| Comparative Example 2 | Poor | Good | Poor | 22.3 | 411 | 7.4 | 67.5 | 67% | 2.87 | 0.00102 |
| Comparative Example 3 | Good | Good | Good | 24.2 | 341 | 6.2 | 59.5 | 64% | 1.97 | 0.00034 |
| Comparative Example 4 | Good | Poor | Poor | 20.4 | 391 | 6.7 | 64.0 | 70% | 2.43 | 0.00037 |
| Comparative Example 5 | Good | Good | Good | 21.4 | 393 | 6.5 | 63.3 | 70% | 2.78 | 0.00037 |

The invention claimed is:

1. A copolymer, comprising tetrafluoroethylene unit and perfluoro (propyl vinyl ether) unit, wherein the copolymer has a content of perfluoro (propyl vinyl ether) unit of 4.2 to 4.9% by mass with respect to the whole of the monomer units, a melt flow rate at 372° C. under a load of 5 kg of 19.0 to 27.0 g/10 min, and the total number of $—CF{=}CF_2$, $—CF_2H$, —COF, —COOH, $—COOCH_3$, $—CONH_2$ and $—CH_2OH$ of 50 or less per $10^6$ main-chain carbon atoms.

2. The copolymer according to claim 1, wherein the melt flow rate at 372° C. is 20.0 to 25.0 g/10 min.

3. The copolymer according to claim 1, wherein the number of functional groups is 20 or less per $10^6$ main-chain carbon atoms.

4. An injection molded article, comprising the copolymer according to claim 1.

5. A coated electric wire, comprising a coating layer comprising the copolymer according to claim 1.

6. A formed article, comprising the copolymer according to claim 1, wherein the formed article is a valve, a gasket, a filter cage, a joint, or an electric wire coating.

* * * * *